United States Patent
Rodniansky et al.

(10) Patent No.: US 10,904,215 B2
(45) Date of Patent: Jan. 26, 2021

(54) DATABASE FIREWALL FOR USE BY AN APPLICATION USING A DATABASE CONNECTION POOL

(71) Applicant: International Business Machines Corporation, Armonk, NY (US)

(72) Inventors: Leonid Rodniansky, Allston, MA (US); Tania Butovsky, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 16/185,736

(22) Filed: Nov. 9, 2018

(65) Prior Publication Data
US 2020/0153794 A1    May 14, 2020

(51) Int. Cl.
*H04L 29/06*    (2006.01)
*G06F 21/62*    (2013.01)

(52) U.S. Cl.
CPC ...... *H04L 63/0245* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 2002/0194497 A1* | 12/2002 | McGuire | ................. | H04L 63/20 726/11 |
| 2004/0243835 A1* | 12/2004 | Terzis | ................... | H04L 63/102 726/3 |
| 2007/0017127 A1 | 7/2007 | Yim et al. | | |
| 2010/0058455 A1 | 3/2010 | Irudayaraj et al. | | |
| 2014/0201838 A1* | 7/2014 | Varsanyi | ............... | G06F 21/552 726/23 |
| 2015/0242531 A1 | 8/2015 | Rodniansky | | |
| 2018/0004682 A1 | 2/2018 | De et al. | | |
| 2018/0173775 A1* | 6/2018 | Li | ......................... | G06F 16/254 |

OTHER PUBLICATIONS

Oracle, "Oracle Audit Vault and Database Firewall," Technical White Paper, May 2017.

(Continued)

*Primary Examiner* — Brandon S Hoffman
(74) *Attorney, Agent, or Firm* — Jeffrey S. LaBaw; David H. Judson

(57) ABSTRACT

An application server environment that uses connection pooling is augmented to include a database access control system having a database firewall. When the database firewall detects a security violation with respect to a request received via a pooled connection, the firewall skips over (i.e. do not forward) the violating request and instead creates an artificial error database protocol packet corresponding to the application request. The database firewall then sends the error database protocol packet as a response back to the application, using the pool connection. The application receives the database error as a response to the security violating request, and it responds by releasing the connection of the policy violation database user. By releasing the pool connection is this manner, the performance of other applications (or other clients) using the connection pool is not impacted. Preferably, the error packets include no sensitive information.

20 Claims, 7 Drawing Sheets

(56) References Cited

OTHER PUBLICATIONS

Hexatier, "Why WAF is not enough for protecting your database," Oct. 22, 2015.
Imperva, "Imperva SecureSphere—Database Firewall," 2018.
IBM, "IBM Guardium S-GATE," Data Sheet, Feb. 2010.
Oracle, "Oracle Audit Vault and Database Firewall," Data Sheet, 2018.
IBM, "InfoSphere Guardium Technical Training," 2011.

\* cited by examiner

```
00000000 : c5 d8 17 3d 81 0d 03 00 09 00 00 00 00 00 00 00   ...=............
00000010 : e0 ff 0f 00 01 00 00 00 27 00 03 00 7c 00 66 69   ........'...|.fi
00000020 : 90 00 00 00 00 00 00 00 00 00 03 00 00 01 00 00   ................
00000030 : 00 00 00 00 00 00 00 00 00 00 00 00 01 21 08 00   .............!..
00000040 : 0c 00 00 00 00 00 00 00 b8 02 04 07 00 00 26 00   ..............&.
00000050 : 00 00 00 00 00 00 00 00 98 ff ff ff 00 00 04 71   ...............q
00000060 : 14 00 00 00 01 04 00 00 ff ff ff ff 00 00 00 00   ................
00000070 : 00 00 00 00 01 00 00 00 00 00 00 20 00 00 00 00   ........... ....
00000080 : 03 00 00 00 03 00 00 00 00 00 00 70 ff 0f 00 00   ...........p....
00000090 : 69 6e 73 65 72 74 20 69 6e 74 6f 20 74 61 62 6c   insert into tabl
000000a0 : 65 20 6a 6f 65 20 76 61 6c 75 65 73 28 31 30 29   e joe values(10)
```

FIG. 8

```
00000000 : c5 d8 17 3d 81 0d 03 00 09 00 00 00 00 00 00 00   ...=............
00000010 : 10 75 00 00 00 00 00 00 27 00 03 00 7c 00 66 69   .u......'...|.fi
00000020 : 9b 00 00 00 00 00 00 00 00 00 03 00 06 00 01 00   ................
00000030 : 00 00 00 00 00 00 00 00 00 00 00 00 00 02 01 00   ................
00000040 : 2e 00 00 00 00 00 00 00 e8 74 00 48 59 30 30 30   .........t.HY000
00000050 : 1b 00 00 00 00 00 00 00 01 65 6e 00 00 00 78 74   .........en...xt
00000060 : 6c 6c 20 73 65 63 75 72 69 74 79 20 65 78 63 65   ll security exce
00000070 : 70 74 69 6f 6e 00 00 00 00 00 00 40 00 00 00 00   ption......@....
00000080 : 00 00 00 00 03 00 00 00 00 00 00 00 1c 00 00 00   ................
00000090 : 01 00 00 00 27 00 00 00 00 00 00 00 01 00 00 00   ....'...........
000000a0 : 74 00 00 00 00 00 00 00 00 00 00 00 00 00 00 60   t..............`
000000b0 : 04 09 00 00 00 00 00 00 00 00 00 00 00 00 00 02   ................
```

FIG. 9

DATABASE FIREWALL FOR USE BY AN APPLICATION USING A DATABASE CONNECTION POOL

BACKGROUND OF THE INVENTION

Technical Field

This disclosure relates generally to securing resources in a distributed computing environment and, in particular, to database access security.

Background of the Related Art

Modern information processing environments typically use an application-server model instead of a traditional client-server model. The application server-based architecture allows each application to perform specific and/or specialized portions of processing before handing a transaction or data stream off to a successive processing tier. An application-server model may utilize a multi-tier arrangement or architecture. In a multi-tier arrangement, each tier is responsible for performing a particular aspect of processing, e.g., database or application tiers can process different data. Different tiers communicate by passing or transmitting data, often according to a predetermined protocol or data structure. A business transaction is therefore passed between tiers, which may be successive layers or nodes in the processing stream. Accordingly, each tier "layer" receives a transaction from a preceding layer.

In an application-server based architecture of this type, the application server typically maintains a pool of connections to the database, e.g., a database connection pool. These connections may be created when the application server first starts, and they can use a single functional account, i.e. the connections are all associated with a single functional identifier for the application front-end without distinguishing between users of the application front-end. These connections are then reused by various user sessions, i.e. multiplexing is used. In other words, when a user logs onto the application front-end, a session is created with the application front-end, and the application front-end gets a connection from the database's connection pool and assigns it to the session. When the session ends, the connection is released back to the pool, and it may then be reused by the application front-end for another session.

Connection pools are used because creating a database connection is a relatively expensive operation, and there is often a large performance impact if a new database connection has to be created each time an application user logged in. Thus, and to avoid this problem, application servers create a pool of reusable connections, rotating through them for application transactions. When a connection pool is created, a single and powerful database user is used to log into the database. The result of connection pooling is a much faster application.

Protecting a database using network-based intrusion detection is well-known. A database firewall is a known database security system that includes a network monitoring component that resides externally to the database itself. A database firewall controls access to sensitive data stored in the database. A representative commercial product that provides this functionality is IBM® Guardium® database firewall solution, also known as S-GATE. A database firewall of this type intercepts database activity (e.g., an SQL statement) of privileged database users on the network. It holds the SQL statement and sends it an appliance that checks for security violation(s). To this end, the appliance parses the SQL up to the database object level and attempts to validate the SQL statement, typically using parsed database objects and security policies. In the event of a security policy violation, typically the database user connection is terminated; otherwise, the SQL statement is released for further processing.

As application server environments that use connection pools become more ubiquitous, there is a desire to implement database firewall-type of protections. Heretofore, however, this has not been possible, as conventional techniques are not useful with the high volume of network traffic that is passed to the database via connection pool connections. Also, techniques in the prior art are not performant, as current approach would respond to detection of a security violation by dropping connections of innocent connection pool users.

BRIEF SUMMARY

An application server environment that uses connection pooling is augmented to include a database access control system having a database firewall. When the database firewall detects a security violation with respect to a request received via a pooled connection, the firewall skips over (i.e. it does not forward) the violating request and instead creates an artificial error database protocol packet corresponding to the application request. The database firewall then sends the error database protocol packet as a response back to the application, using the pool connection. The application receives the database error as a response to the security violating request, and it responds by releasing the connection of the policy violation database user. By releasing the pool connection is this manner, the performance of other applications (or other clients) using the connection pool is not impacted. Preferably, the error packets include no sensitive information.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which:

FIG. 8 depicts a representative database protocol packet that is intercepted and analyzed by a database firewall that is configured to implement the technique of this disclosure;

FIG. 9 depicts a representative database protocol packet that is artificially-generated by the database firewall and returned to the application when the technique of this disclosure is implemented.

DETAILED DESCRIPTION OF AN ILLUSTRATIVE EMBODIMENT

Figure 1:
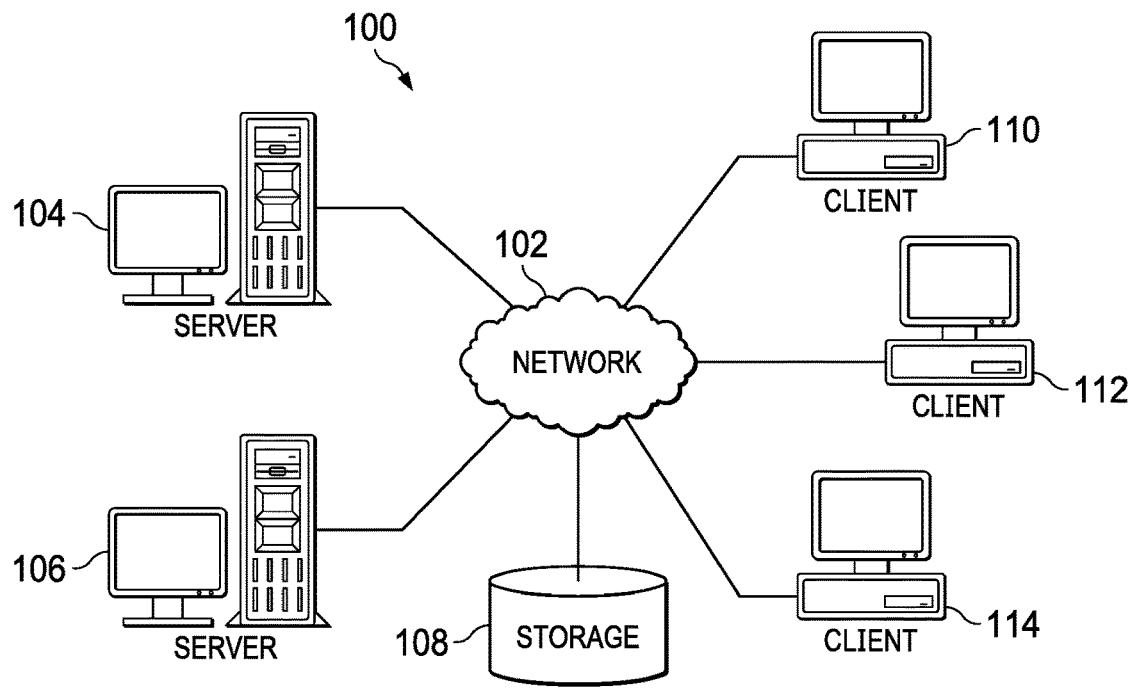
FIG. 1 depicts an exemplary block diagram of a distributed data processing environment in which exemplary aspects of the illustrative embodiments may be implemented.
Figure 2:
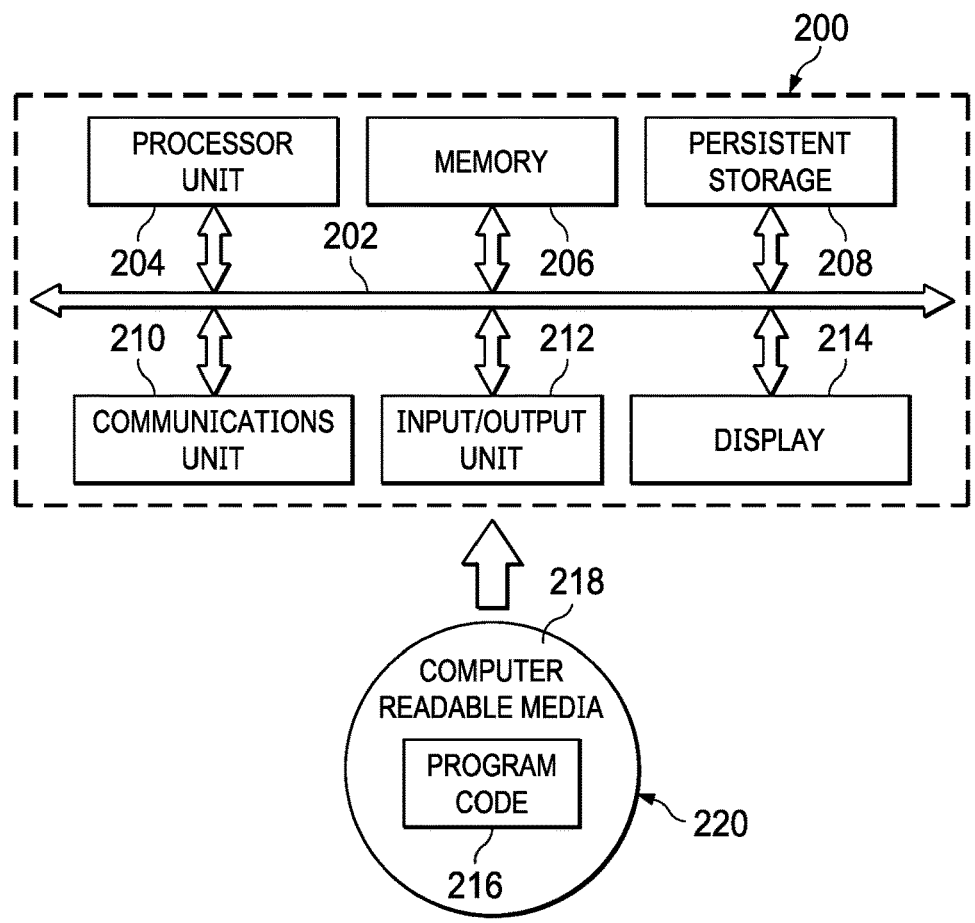
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Local Database Access Control

Auditing and logging operations, as well as highly security-sensitive applications, expect coverage of all local and remote access attempts. To this end, and as described above, it is known in the prior art to enhance conventional network-based intrusion detection and monitoring by intercepting local access attempts in addition to the database access attempts occurring via the network. A Local Database Access Control System (LDACS) provides this functionality. In this approach, typically an IPC intercept is defined to identify an access point common to local and remote DB access attempts. Local access attempts to the database are intercepted and transported to a data security device operable for network monitoring of the access attempts. Because the data security device is remote, it is sometimes referred to herein as an "external security device" (or "ESD"), or "external-to-database non-intrusive security mechanism ("EDSM"). The IPC intercept performs interception of the local access attempts through a minimal footprint implementation object to mitigate resource overhead. In this manner, the remote network data security device observes both the local access attempts via interception at the DB host and transmission of the intercepted access attempts to the data security device, and the remote access attempts via the network, thereby consolidating analysis and logging of the data access attempts to the database resource via the data security device.

Figure 3:
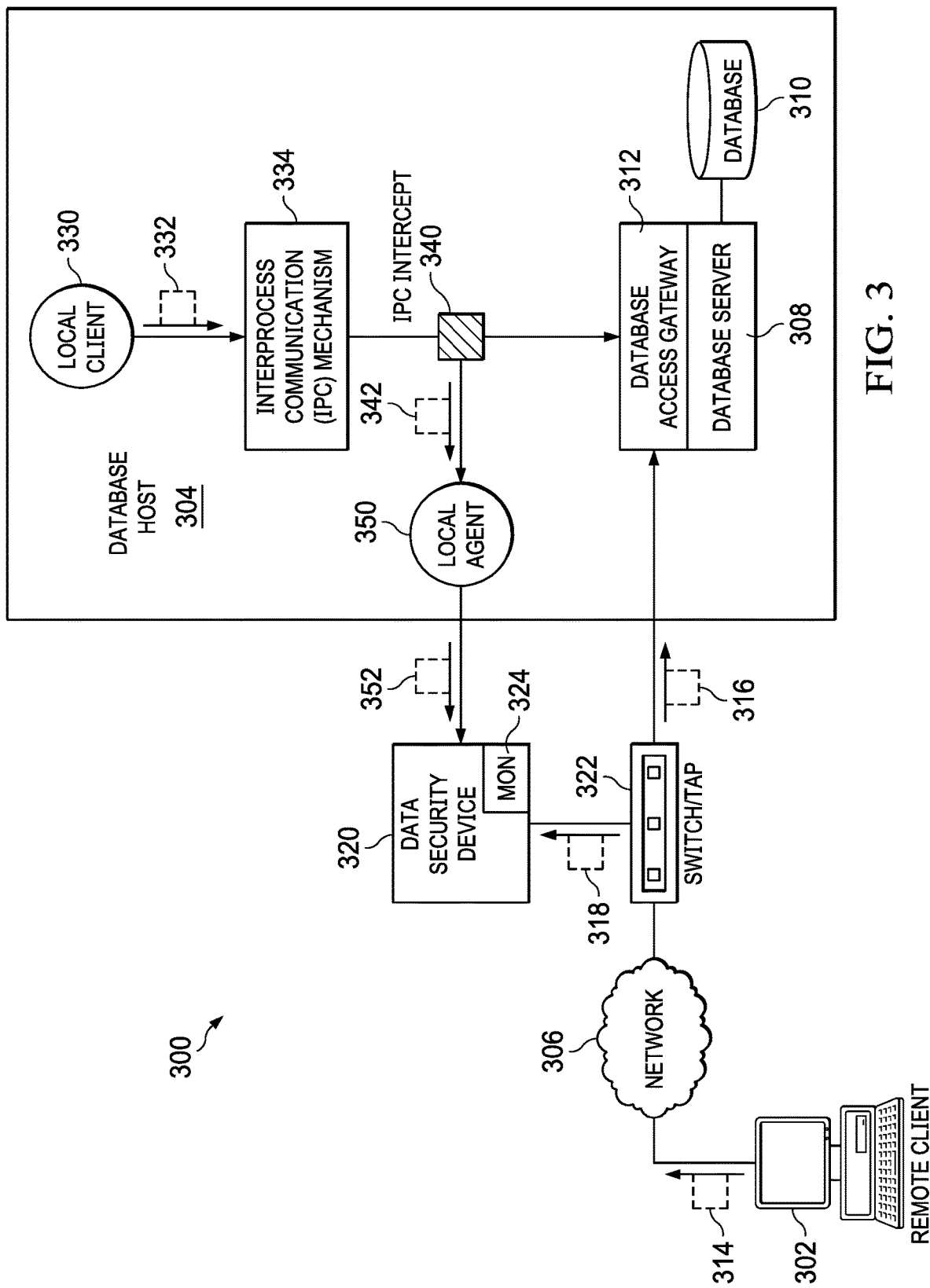
FIG. 3 depicts the high level operation of a known Local Database Access Control System (LDACS)

FIG. 3 illustrates this basic operation in more detail. Referring to FIG. 3, the environment 300 provides a remote user 302 with a database (DB) host 304 for data storage and retrieval operations (DB operations). The user 302 connects to the host 304 via an access network 306, which may be any suitable internetworking infrastructure such as a LAN, intranet, extranet or the Internet. The DB host 304 includes a database server 308 connected to the database 310, typically a disk array or set of mass storage devices such as disk drives. The database 308 includes a DB access gateway 312, which operates as an application programming interface (API) for user 302 access via a variety of access methods.

A user initiates access to the database in the form of a user request 314, which passes through the network 306 for delivery to the DB access gateway 312 as an incoming request 316. A data security device 320 is connected via a switch e22 or other connectivity device such as a tap, router or bridge, on the path from the network 306 to the host 304. The data security device 320 includes a DB monitor 324 for receiving user requests 314 sent through the switch 322. The DB monitor receives and analyzes the incoming user request 314 as a tapped access attempt 318, which the DB monitor 324 analyzes according to a predetermined security or access policy. The data security device 320 then passes the tapped access attempt 318 to the access gateway (AG) 312 as an incoming request 116.

Typically, the database server 308 expects a substantial portion of DB traffic (user requests 314) to arrive remotely via the network 306, and thus pass scrutiny under the data security device 320. However, a portion of database access attempts emanate locally from a local client 330, executing on the host 304, as local access attempts 332. The local access attempts 332 arrive at the access gateway 312 via an Inter-Process Communication (IPC) mechanism 334. Such local access attempts 332 do not pass through the switch 322, and therefore may otherwise be operable to elude scrutiny of the data security device 320. To address this concern, a known LDACS solution employs an IPC intercept 340 for intercepting the local access attempt 332 and transporting the intercepted access attempt 342 to a local agent 350. The local agent 350 determines, by interrogating the IPC mechanism 334, a database instruction 352 corresponding to the local access attempts 332. The local agent 350 then transmits the determined database instruction 352 to the data security device 320 for analysis and further operations by the DB monitor 324. In this manner, the data security device 320 receives all local and remote access attempts to the DB server 308 to more fully analyze, monitor, and guard against access attempts that may be undesirable. Although the above-described configuration is preferred, the agent 350 need not be local, but rather may be positioned in other locations or configurations associated with a database host or system.

In a typical DB host 304, the local client 330 may employ a variety of IPC mechanisms 334 to transmit local access attempt 332 to the DB server 308. IPC typically is not secure. Alternate configurations may employ other communication mechanisms, such as cryptographic remote method invocation.

Figure 4:
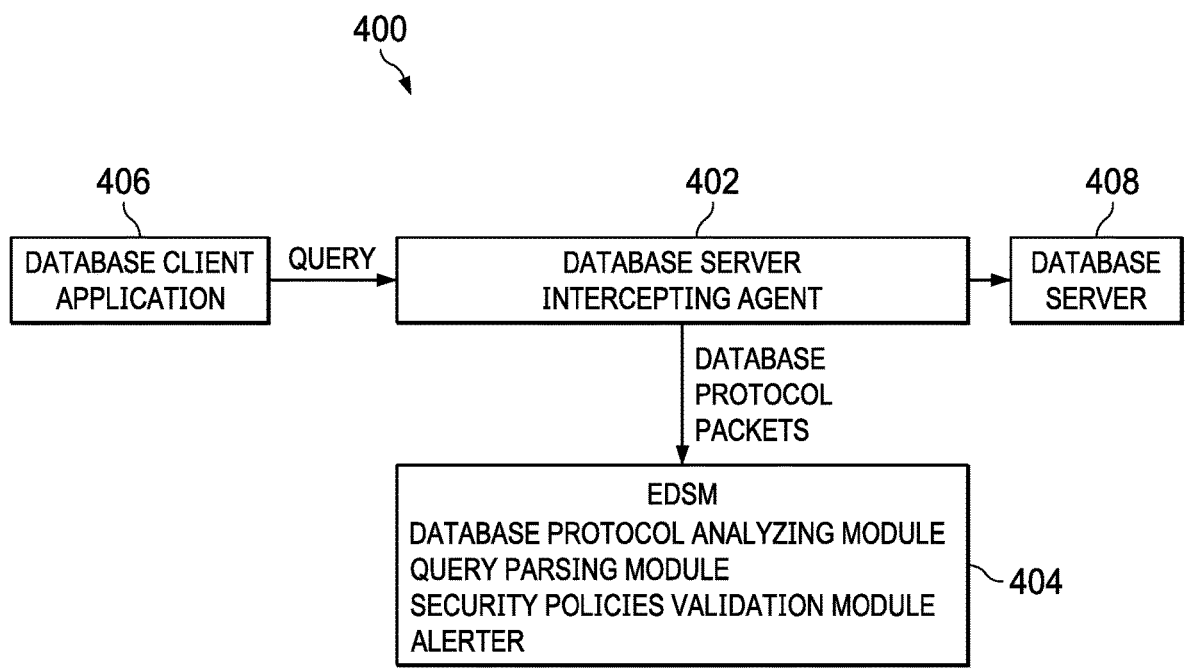
FIG. 4 is a process flow diagram illustrating the known operation of database access control of FIG. 3.

FIG. 4 depicts the basic operation of a database access control system 400 that comprises the database server intercepting agent 402 and an associated EDSM 404. As shown, the agent 402 is situated in-line between the database client application 406, and the database server 408. Queries initiated to the database server 408 by the database client application 406 are intercepted by agent 402 (sometimes referred to as an Intercepting Server Agent (ISA)), and database protocol packets comprising those queries are forwarded to the EDSM 408 for evaluation. Typically, and as used herein, a database protocol packet refers to a formatted unit of data used in communication between the database client application and the database server. As is known, EDSM 408 typically includes several modules, e.g., a database protocol analyzing module, a query parsing module, a security policy validation module, and an alerting module. These modules typically are implemented as software executing in hardware. The core function of the EDSM is to extract the database query that is sent by the database client application 406 to the database server 408 and intercepted by the agent 402, parse this query up to a database object level, validate it (for potential database object access violations) against one of more EDSM security policies. If an access violation is detected, the EDSM issues an alert to this effect, or takes some other notification, mitigation or remediation function.

Typically, the ISA communicates with the ESM via TCP/IP and in a secure (i.e., encrypted) manner. The ESM receives connections from the ISA on a given physical port. Preferably, the ESM includes a queue that receives (for processing with the ESM) requests sent from the ISA.

The system as described above provides for a database firewall, namely, a network monitoring component that typically resides external to the database itself. A database firewall controls access to sensitive data stored in the database itself. A representative commercial product that provides this functionality is IBM® Guardium® database firewall solution, also known as S-GATE. As described above, a database firewall of this type intercepts database activity (e.g., an SQL statement) of privileged database users on the network. It holds the SQL statement and sends it the EDSM appliance. The appliance parses the SQL up to the database object level and attempts to validate the SQL statement, typically using parsed database objects and security policies. In the event of a security policy violation, typically the database user connection is terminated; otherwise, the SQL statement is released for further processing.

The commercial product/solution mentioned above is not intended to be limiting.

Database Access Control in a Multi-Tiered Processing System

Modern information processing environments can use an application-server model instead of the traditional client-server model. The application-based architecture allows each application to perform specific and/or specialized portions of processing before handing a transaction or data stream off to a successive processing tier. An application-server model may utilize a multi-tier arrangement or architecture. In a multi-tier arrangement, each tier is responsible for performing a particular aspect of processing, e.g., database or application tiers can process different data. Different tiers communicate by passing or transmitting data, often according to a predetermined protocol or data structure. A business transaction is therefore passed between tiers, which may be successive layers or nodes in the processing stream. Accordingly, each tier "layer" receives a transaction from a preceding layer.

In an application-server based architecture of this type, the application server typically maintains a pool of connections to the database, e.g., a database connection pool. These connections may be created when the application server first starts, and they can use a single functional account, i.e. the connections are all associated with a single functional identifier for the application front-end without distinguishing between users of the application front-end. These connections are then reused by various user sessions, i.e. multiplexing is used. In other words, when a user logs onto the application front-end, a session is created with the application front-end, and the application front-end gets a connection from the database's connection pool and assigns it to the session. When the session ends, the connection is released back to the pool, and it may then be reused by the application front-end for another session.

Connection pools are used because creating a database connection is a relatively expensive operation, and there is often a large performance impact if a new database connection has to be created each time an application user logged in. Thus, and to avoid this problem, application servers create a pool of reusable connections, rotating through them for application transactions. When a connection pool is created, a single and powerful database user is used to log into the database. The result of connection pooling is a much faster application.

Figure 5:
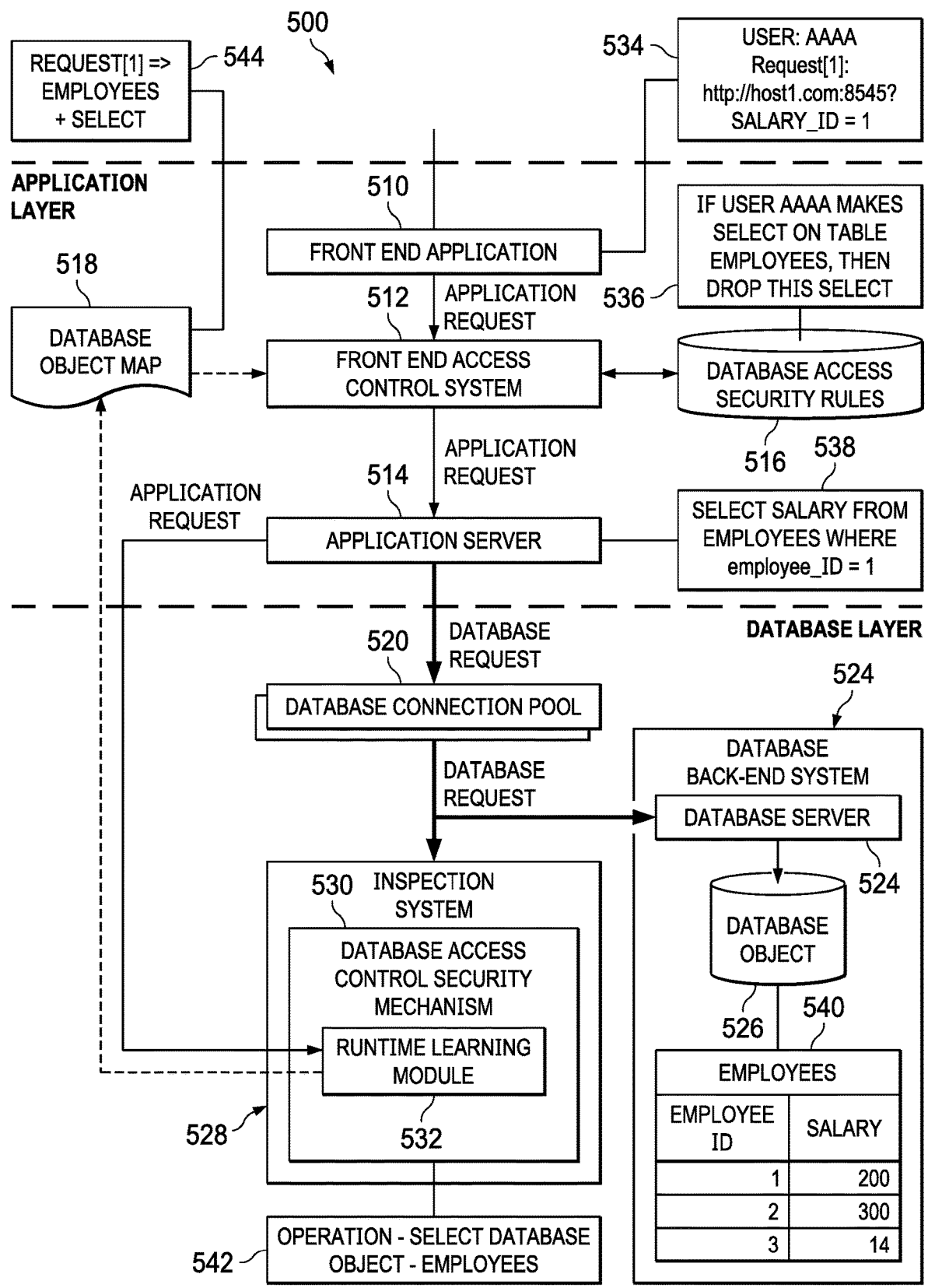
FIG. 5 depicts a multi-tiered computing environment comprising an application layer, and a database layer that includes a database connection pool.

FIG. 5 is a block diagram of a multi-tiered system 500 that uses database access control wherein a database layer includes a database connection pool. Both the application layer and the database layer are depicted. The applications layer typically comprises a front-end application 510, a front-end access control system (FACSM) 512, an application server 514, database access security rules (DASR) 516, and a database object map 518. In this example scenario, the application layer interacts with the database layer through the application server 514. The application server 514 receives application requests from the front-end application 510. The application server 514 processes an application request. In particular, and during the processing of the application request, the application server 514 determines one or more database processing actions from the database. For example, in an application that fetches data based on the user, the application server 514 needs to produce database requests that fetch the desired data for the user to access on the application. Any number of database requests can result from the application request.

The database request can be in any format, such as SQL commands. As depicted, in this embodiment, the database request is received by a database connection pool 520. The database connection pool 520 establishes a connection to the application server 514 via a session, as described above. Preferably, the database connection pool 520 is always established for fast processing of database requests. The database connection pool 520, which as depicted typically exists in the database layer, communicatively couples the session with a database back-end system 522 and an inspection system 528. Thus, FACSM 512 and the inspection system 528 correspond to the ISA and ESM elements previously described in FIG. 3 above. The database back-end system 522 includes a database server 524 that can access a database object 526. The database back-end system 522 is responsible for accessing database objects and the corresponding records. The database server 524 typically is a computer or a database accessing service. The database server 524 accesses the database objects 526 from the database. The database object 526 is provided to the application server 514 through the database connection pool 520.

Typically, the inspection system 528 is isolated from the database back-end system 522 and does not communicate with the database back-end system 522, although this is not necessarily a requirement. As depicted, the inspection system 528 includes a database control security mechanism 530 and, in this particular embodiment, a runtime learning module 532. The learning module is not required. In operation, the inspection system 528 inspects the statements, e.g., SQL statements, generated by the application server 514. The inspection system 528 typically stores the database request, or at least an identifier of the database request, and its associated unique values as obtained from the database request. In operation, the inspection system 528 inspects the database requests that are destined for the database server 524. In one embodiment, the inspection system 528 receives the database request simultaneously with the database server 524. The inspection system 528 also can be configured to receive the database request before passing the database request to the database server 524. Typically, the inspection system 528 is a routine or a program within the database layer.

When utilized, the runtime learning module (RLM) 532 is configured to further update the database object map 518 using the database object 526. Typically, this module does not have access to the database back-end system 522. In this embodiment, which is merely representative, the RLM 532 is part of inspection system 328, and it may be non-intrusive. As described, the inspection system 528 intercepts database protocol data sent through the database connection pool 520 to the database server 524. In this example embodiment, the RLM 332 monitors the database object 3526 for database operations. In various embodiments, the RLM 532 examines a time interval of the database request and application request to determine the database object and the database operation mapped to application request. For example, if a database request is received within the past 5 milliseconds describing the database object 526, and an application request performed within the past 10 milliseconds, then the RLM 332 maps the database object 526 to the application request. The RLM 532 typically also writes the information to the database object map 518.

To illustrate the operation of the system 500, consider an example of a user requesting salary information. The user is interacting with the front end application 310 and produces an application request 534 of salary information for a particular salary ID. The application request 534 can refer to a URL of the application server 514. As described above with respect to FIG. 3, the FACSM 512 preferably holds the URL until the user is cleared for the database operation, which proceeds as follows. The FACSM 512 receives the application request 534 and searches the DASR 516 for an applicable security rule. In this case, the security rule 536 contains the database object and the database operation that is allowed for the user. Because security rule specifies the database object and the database operation, the FACSM 512 consults the database object map 518. Assuming that the database object map 518 does not specify the database object and the database operation that corresponds to the application request, FACSM 512 forwards the application request to the application server 514 and inspection system 528 with instructions to map the application request to the database object and the database operation. Once received, the application server 514 creates a database request 538. The database request specifies the database object and the database operation, as well as the attributes to access on the database server 524. The database request 538 is sent to the database connection pool 520 and to the inspection system 528. The database server 524 then processes the database request concurrent with the inspection system 528. The database server 524 performs the database operation at the database object, e.g., 540. In this example, the database object is an employee table 540 that lists the salaries for various employees. The database operation in this example is a select for the employee table 540, e.g., in database request 538. The runtime learning module 532 determine the database operation and database object 542 of the database request and update the database objects map 518.

Database Firewall for an Application Using a Connection Pool

Figure 6:
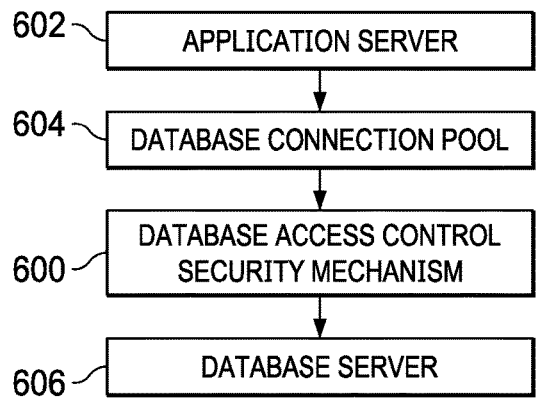
FIG. 6 depicts how a database firewall is configured according to this disclosure to enable applications that use connection pools to provide database security.

With the above as background, and with reference now to FIG. 6, the technique of this disclosure is now described. The approach implements a database access control security mechanism (DACSM) (the database firewall) 600 in association with an application server 602 executing an application that utilizes a database connection pool 604. As depicted, preferably the database firewall 600 is configured (installed) between the connection pool 604 and, as described above, preferably the database firewall is configured (installed) between the connection pool 604 and a database server 606. As will be seen, the approach herein substantially improves performance of the database firewall 600 for the application, whether or not the application itself is leveraging the connection pool. Preferably, the database firewall does not interact with the database server 606 in the event a security violation is found in the application request issued to the database. As such, the overall load on the database server is decreased. In a representative operating scenario, when the database firewall 600 detects that a request (e.g., but without limitation an SQL statement) violates a particular security policy, the firewall implements a preferred response, which is now described.

In particular, and in lieu of sending the request statement to the database server, the firewall preferably skips over the request and creates a database protocol error packet, which is sometimes referred to herein as an artificially-created database protocol error packet. Instead of passing the request to the database server, the firewall instead returns the artificially-created database protocol error packet back to the application. Preferably, the database protocol error packet is delivered back to the application via a database pool connection, and the database server is not involved with this communication. Error database protocol packets of this type are short, and they are easy to construct. In one embodiment, the error database protocol packets are constructed from one or more templates that are stored in a database (or other data storage) cache. Preferably, such error database protocol packets are configured so that they do not contain secret or sensitive data, and they are created in a manner that does not impose any additional performance impact on the system. These packets are created and delivered as necessary by the firewall, all the while preserving pool connection(s) intact. When the client application receives the request error (as reflected by the database protocol error packet, it immediately releases the pooled connection. The notion of releasing here is synonymous with the application dropping or termination the connection in question.

Figure 7:
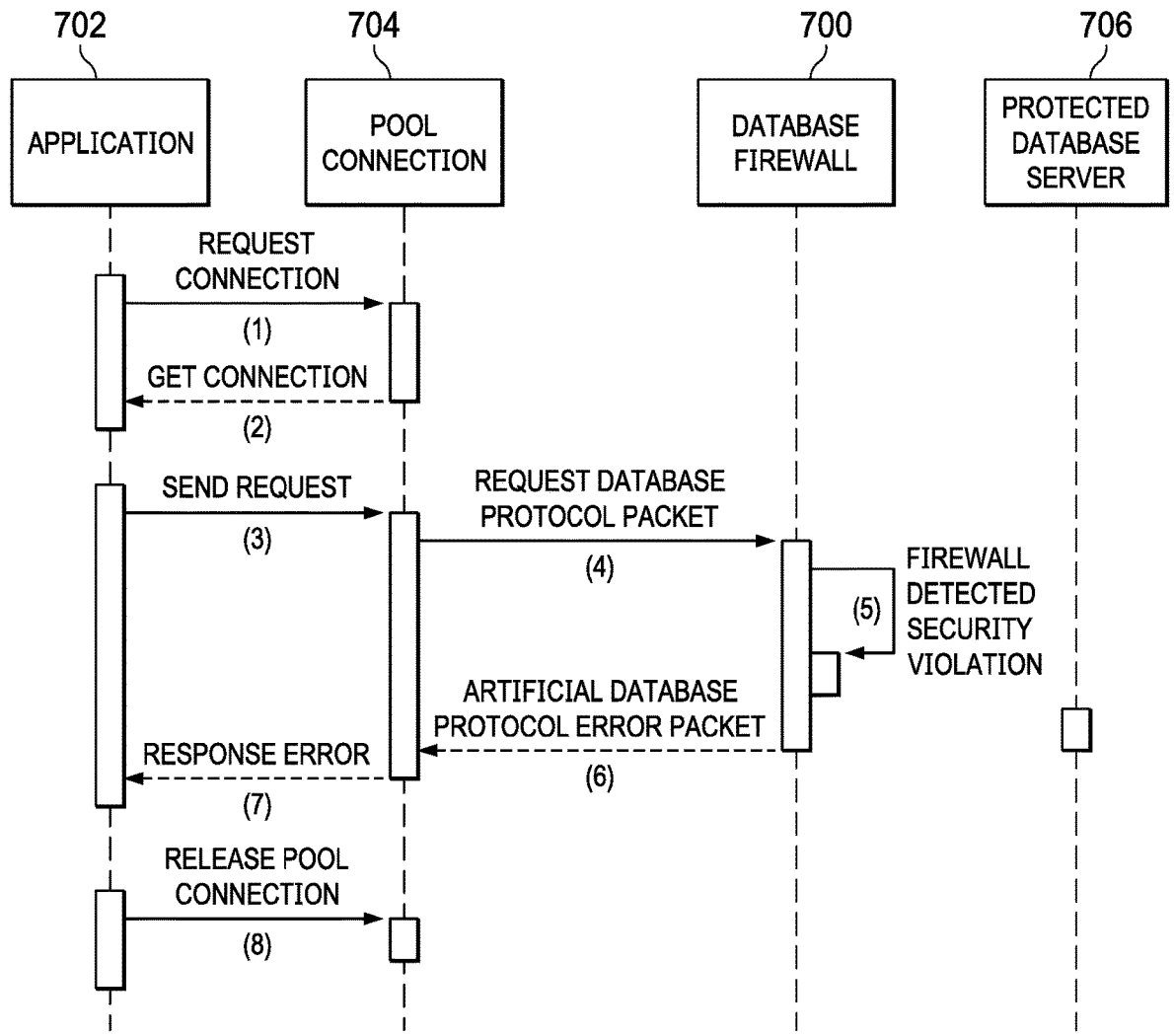
FIG. 7 depicts a representative sequence diagram of a request flow and response implemented by the database firewall according to this disclosure.

FIG. 7 depicts a representative sequence diagram showing the operation of the database firewall 700 in a representative embodiment of the technique. The sequence diagram depicts a representative interaction among the application 702, a pool connection 704 (provided by a connection pool), the database firewall 700, and the protected database server 706. Familiarity with database protocol semantics and interactions is presumed. In this example, the application 702 is a HANA (High Performance Analytic Application) application. A HANA application is one that uses an in-memory computing engine that provide for processing of large amounts of real-time data over a short time period. The in-memory computing engine allows the HANA application to process data stored in RAM, as opposed to reading it from disk. The technique herein is not limited for use with such applications, but these types of applications achieve significant performance enhancements when leveraging the technique of this disclosure. At step (1), the application 702 requests a connection from the connection pool, which returns the connection at step (2). At step (3), the application sends a request to the database. As noted above, the technique of this disclosure is implemented in the context of an application using a connection pool, and thus typically there will one or more application users (using connections drawn from the connection pool) but only a single database user (representing the pooled connections).

Assume that the database firewall 700 implements one or more security rules, such as the following: If (user not JOE) then (do not allow INSERT into table JOE). Assume further that the request sent by the application user (e.g., SYSTEM) is to insert information into the database, and thus the request may be configured as follows: hdbsql HD→insert into table joe values (10), where the application is hdbsql. Step (4) depicts the request being sent to the database firewall 700 over the pooled connection in the form of a database protocol packet. In response, and as depicted at step (5) (and as described above), the database firewall 700 holds the database protocol packet, parses the database protocol packet and extracts (in the case) the SQL statement, parses and analyzes the SQL statement, and checks the security rule, in this example finding a security violation where user SYSTEM is not allowed to insert data into table JOE. When the database firewall 700 detects the security rule violation, and in lieu of forwarding the database protocol packet to the protected database server 708 (as depicted by the X in the figure), the firewall creates an error response. As noted above, preferably the error response is in the form of a database protocol packet. Preferably, the error response is prepared (i.e. includes) a relevant database error code and error message that relates to the firewall exception. This response is one that typically does not exist at the database server level itself and, as noted above, it sometimes is referred to herein as being artificially-created.

At step (6), and as response to the database protocol packet sent in step (4), the artificially-created database protocol error packet is returned. At step (7), the database protocol error packet is returned (via the connection pool) to the application 702. In particular, and in this example, application hdbsql receives the error (namely, HANA error code "*258 insufficient privilege: firewall security exception SQLSTATE: HY000") in response to the SQL statement. In reply, the application issues a request to release the pool connection. This is step (8). In particular, the hdbsql application needs to handle the "insufficient privilege" error. Because of the error response, the pool connection is released. This ends the processing.

Thus, and according to the technique herein, an application is associated with a connection pool, and a database firewall. When the database firewall detects a security violation with respect to a request received via the pooled connection, it skips over the violating request and creates an artificial error database protocol packet corresponding to the application request. The database firewall then sends that packet as a response back to the application via the pool connection. The application receives the database error as a response to the security violating request, and responds by releasing the pool connection. In this manner, the performance of other applications using the connection pool is not impacted. Preferably, the error packets no secure information.

FIG. 8 represents the database protocol packet that includes the SQL statement.

FIG. 9 represents the database protocol packet that includes the error response. This is the packet that is artificially-created by the database firewall according to this technique.

Figure 10:
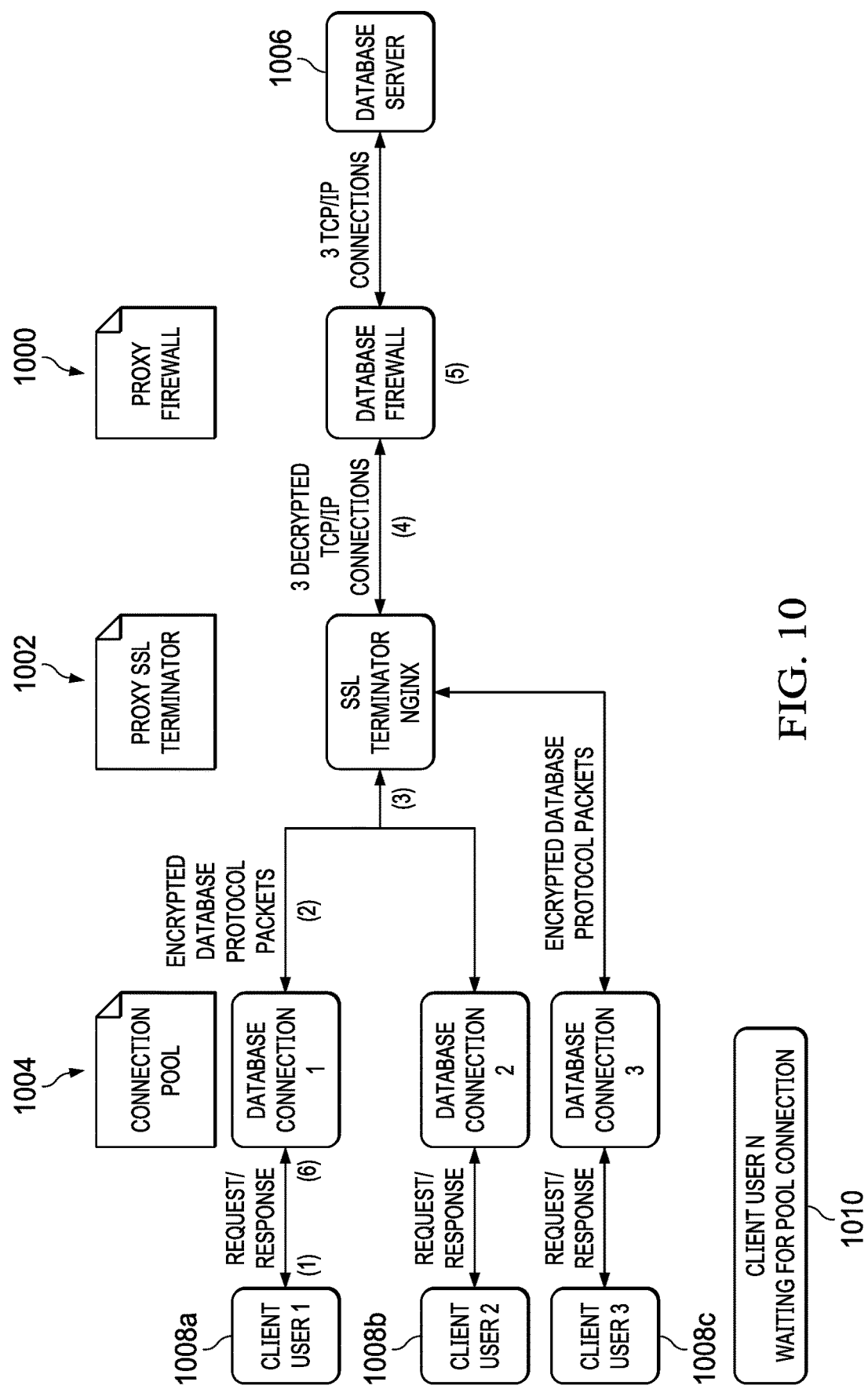
FIG. 10 depicts an alternative embodiment wherein the database firewall is implemented in association with a TLS termination proxy.

FIG. 10 depicts another embodiment wherein the technique is implemented in association with a SSL/TLS termination proxy (e.g., NGINX, HAProxy, or the like), which is the "application." In this example, the SSL/TLS terminator 1002 is positioned intermediate the connection pool 1004 and the database firewall 1000 (and thus the database server 1006). The database firewall 1000 may comprise a proxy firewall (or a component thereof). Here, there are several active client users 1008a, 1008b and 1008c, with client user "n" 1010 waiting for a pool connection. As depicted at step (1), client user 1008a receive connection 1 from the connection pool 1004. At step (2), the client sends a request via connection 1. This request is encrypted via SSL/TLS. At step (3) depicted, the request in the form of one or more encrypted database protocol packets arrives at the SSL terminator 1002. At step (4), the terminator 1002 decrypts them and forwards the decrypted one or more database protocol packets to the database firewall 1000. At step (5), the database firewall performs one or more security checks on the decrypted database protocol packets. If there is no security violation, the packets are forwarded on to the database server 1006. If, however, a database security violation occurs, the database firewall returns the artificial error database protocol packet back to the SSL terminator 1002. As noted, preferably the error packet includes an appropriate error code and relevant database firewall error message, but no sensitive information. At step (6), the SSL termination 1002 returns an encrypted response via connection 1. The client receives the response and releases the connection, which may then be used by the waiting client 1010.

As can be seen, the "application" associated with the connection pool thus may be configured upstream of the connection pool (FIG. 7), or it may be an application configured downstream of the connection pool (FIG. 10). Typically, the application is hosted on an application server.

The subject matter herein provides numerous advantages. The technique provides for an improved operation of a database firewall, and it enables a firewall of this type to be implemented for the first time in the context of application servers that use connection pools. The technique enables the database firewall to operate efficiently (and in a highly scalable, reliable and available manner) to detect and address a malicious user security violation but without impacting other innocent connection pool users. The approach herein is highly-performant, and it operates in a manner that ensures protection of sensitive information, as preferably the artificially-generated error response message does not include any secret information. Rather, the message is simple to construct (e.g., from an existing template), and its receipt causes the application to release the pool connection.

Generalizing, the database firewall functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed technique are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The database server itself may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the agent and EDSM components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the EDSM described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

The database firewall may be implemented "as-a-service," e.g., in a cloud environment.

The database firewall technique described herein is not limited for use with any particular database access protocol, and it may be applied in other database access schemes generally. Thus, while the depicted approach is a preferred operating environment, the approach may be implemented in any database access scheme wherein database client requests are processed for potential security violations in the manner described.

Except as otherwise described, the semantics of the error response are not intended to be limited to any particular format or content.

The approach herein may be used irrespective of the database server request semantics, and with respect to any type of database server including, without limitation, relational, document collection-based, graph-based, and the like.

The notion of a "database firewall" is not intended to be limiting, as the approach herein may be implemented as a security feature in other software security systems that monitor inbound database traffic, whether or not that systems designate that functionality as a "database firewall."

The techniques herein provide for improvements to another technology or technical field, namely, database access control systems, as well as improvements to the operational capabilities of such systems when used in the manner described.

Having thus described our invention, what we claim is as follows:

1. A method to protect a database, comprising:
   configuring a database firewall in association with an application using a database connection pool, wherein the database connection pool comprises a plurality of reusable connections to the database;
   receiving an application request at the database firewall over a connection of the database connection pool;
   in response to detecting a security violation associated with the application request, generating an artificial database protocol packet; and
   in lieu of forwarding the application request for processing by the database, and in response to the application request, returning the artificial database protocol packet, whereby receipt of the artificial database protocol packet releases the connection while maintaining intact one or more other connections of the database connection pool.

2. The method as described in claim 1 wherein the artificial database protocol packet comprises an error code, together with an associated database firewall error message.

3. The method as described in claim 2 wherein the artificial database protocol packet is devoid of sensitive information.

4. The method as described in claim 1 wherein the artificial database protocol packet is constructed from a template.

5. The method as described in claim 1 wherein the application is one of: an application configured upstream of the connection pool, and an application configured downstream of the connection pool.

6. The method as described in claim 1 wherein the database firewall comprises an interception agent, and an associated external-to-database non-intrusive security mechanism (EDSM), the EDSM being configured to detect the security violation.

7. The method as described in claim 1 wherein the database firewall is configured as a service.

8. Apparatus, comprising:
   a processor;
   computer memory holding computer program instructions executed by the processor to protect a database, the computer program instructions comprising program code configured to:
   implement a database firewall in association with an application using a database connection pool, wherein the database connection pool comprises a plurality of reusable connections to the database;
   receive an application request at the database firewall over a connection of the database connection pool;
   in response to detecting a security violation associated with the application request, generate an artificial database protocol packet; and
   in lieu of forwarding the application request for processing by the database, and in response to the application request, return the artificial database protocol packet, whereby receipt of the artificial database protocol packet releases the connection while maintaining intact one or more other connections of the database connection pool.

9. The apparatus as described in claim 8 wherein the artificial database protocol packet comprises an error code, together with an associated database firewall error message.

10. The apparatus as described in claim 9 wherein the artificial database protocol packet is devoid of sensitive information.

11. The apparatus as described in claim 8 wherein the artificial database protocol packet is constructed from a template.

12. The apparatus as described in claim 8 wherein the application is one of: an application configured upstream of the connection pool, and an application configured downstream of the connection pool.

13. The apparatus as described in claim 8 wherein the database firewall comprises an interception agent, and an associated external-to-database non-intrusive security mechanism (EDSM), the EDSM being configured to detect the security violation.

14. The apparatus as described in claim 8 wherein the database firewall is configured as a service.

15. A computer program product in a non-transitory computer readable medium, the computer program product holding computer program instructions executed by a processor to protect a database, the computer program instructions comprising program code configured to:
  implement a database firewall in association with an application using a database connection pool, wherein the database connection pool comprises a plurality of reusable connections to the database;
  receive an application request at the database firewall over a connection of the database connection pool;
  in response to detecting a security violation associated with the application request, generate an artificial database protocol packet; and
  in lieu of forwarding the application request for processing by the database, and in response to the application request, return the artificial database protocol packet, whereby receipt of the artificial database protocol packet releases the connection while maintaining intact one or more other connections of the database connection pool.

16. The computer program product as described in claim 15 wherein the artificial database protocol packet comprises an error code, together with an associated database firewall error message.

17. The computer program product as described in claim 16 wherein the artificial database protocol packet is devoid of sensitive information.

18. The computer program product as described in claim 15 wherein the artificial database protocol packet is constructed from a template.

19. The computer program product as described in claim 15 wherein the application is one of: an application configured upstream of the connection pool, and an application configured downstream of the connection pool.

20. The computer program product as described in claim 15 wherein the database firewall comprises an interception agent, and an associated external-to-database non-intrusive security mechanism (EDSM), the EDSM being configured to detect the security violation.

* * * * *